May 3, 1927.

C. E. HIRST 1,627,331

SCREW AND NUT ACTUATING MECHANISM

Filed Jan. 3, 1925   2 Sheets-Sheet 1

May 3, 1927.
C. E. HIRST
1,627,331
SCREW AND NUT ACTUATING MECHANISM
Filed Jan. 3, 1925    2 Sheets-Sheet 2
*Fig.2.*
*Fig.3.*
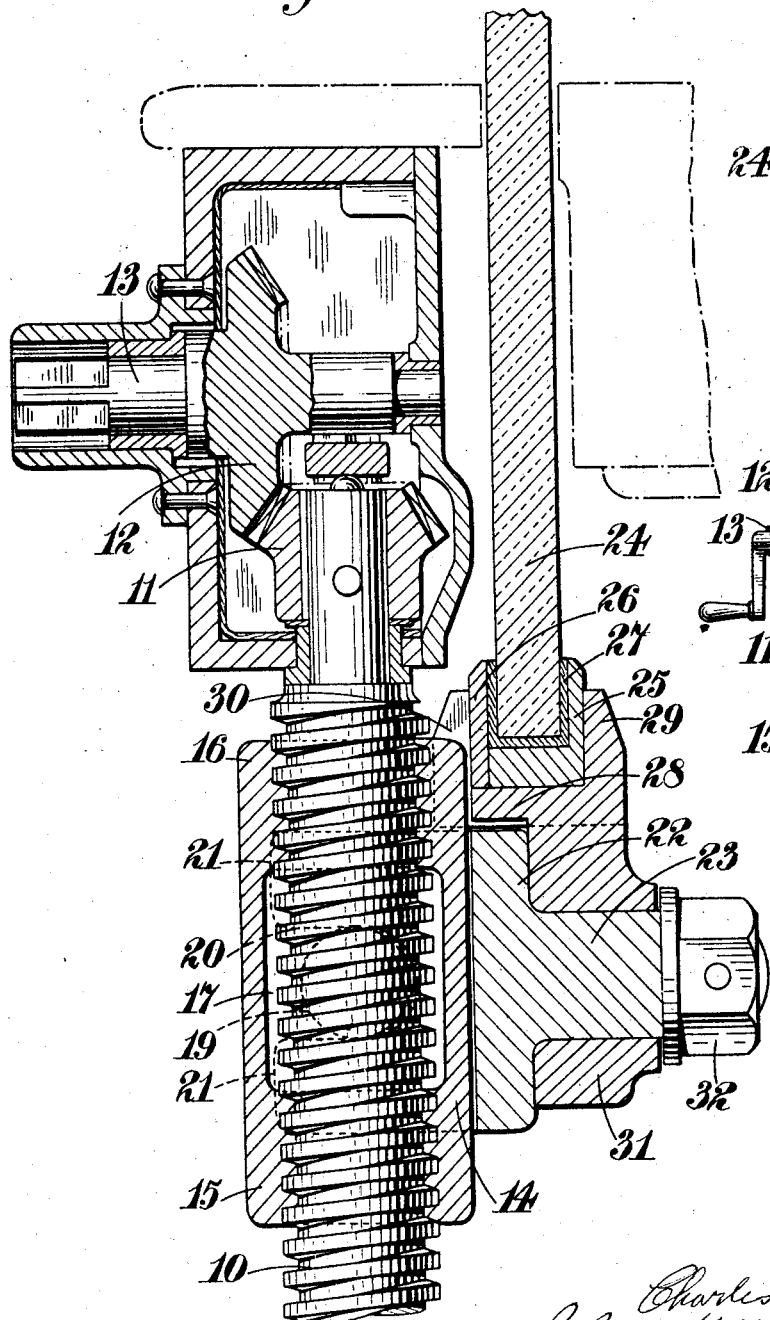
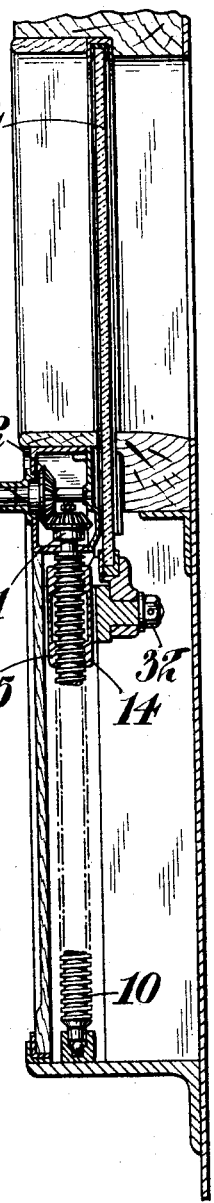
INVENTOR
Charles E. Hirst Patented May 3, 1927.

1,627,331

UNITED STATES PATENT OFFICE.

CHARLES EDWARD HIRST, OF LONDON, ENGLAND, ASSIGNOR TO BECKETT, LAYCOCK & WATKINSON LIMITED, OF LONDON, ENGLAND, A BRITISH COMPANY.

SCREW AND NUT ACTUATING MECHANISM.

Application filed January 3, 1925, Serial No. 456, and in Great Britain February 6, 1924.

This invention relates to screw-and-nut actuating mechanism such as is used for example for actuating ships' sliding windows, wherein the nut is attached to the window and the screw is turned by hand to move the window.

The invention aims at providing means for automatically lubricating the screw-threads of the screw and nut, and it consists in providing the nut with a cavity opening into the threaded bore thereof for the reception of a lubricant.

Preferably the cavity is constituted by an enlargement of the threaded bore extending over a portion of its length whereby the lubricant is in contact with the screw on all sides.

There may be a filling-hole leading from the outside of the nut into the cavity, and there may be means (for example a compressed-air or spring-actuated grease-cup) for feeding lubricant to the cavity and maintaining it under pressure.

The invention is particularly applicable to the actuating mechanism of sliding windows for ships, and a suitable construction thereof is illustrated in the accompanying drawings, in which—

Figure 2 is a sectional view on the line 2—2 of Figure 1; and

Figure 3 is a sectional view of a complete window and its operating mechanism.

Like reference characters indicate like parts in both the figures.

Figure 1:
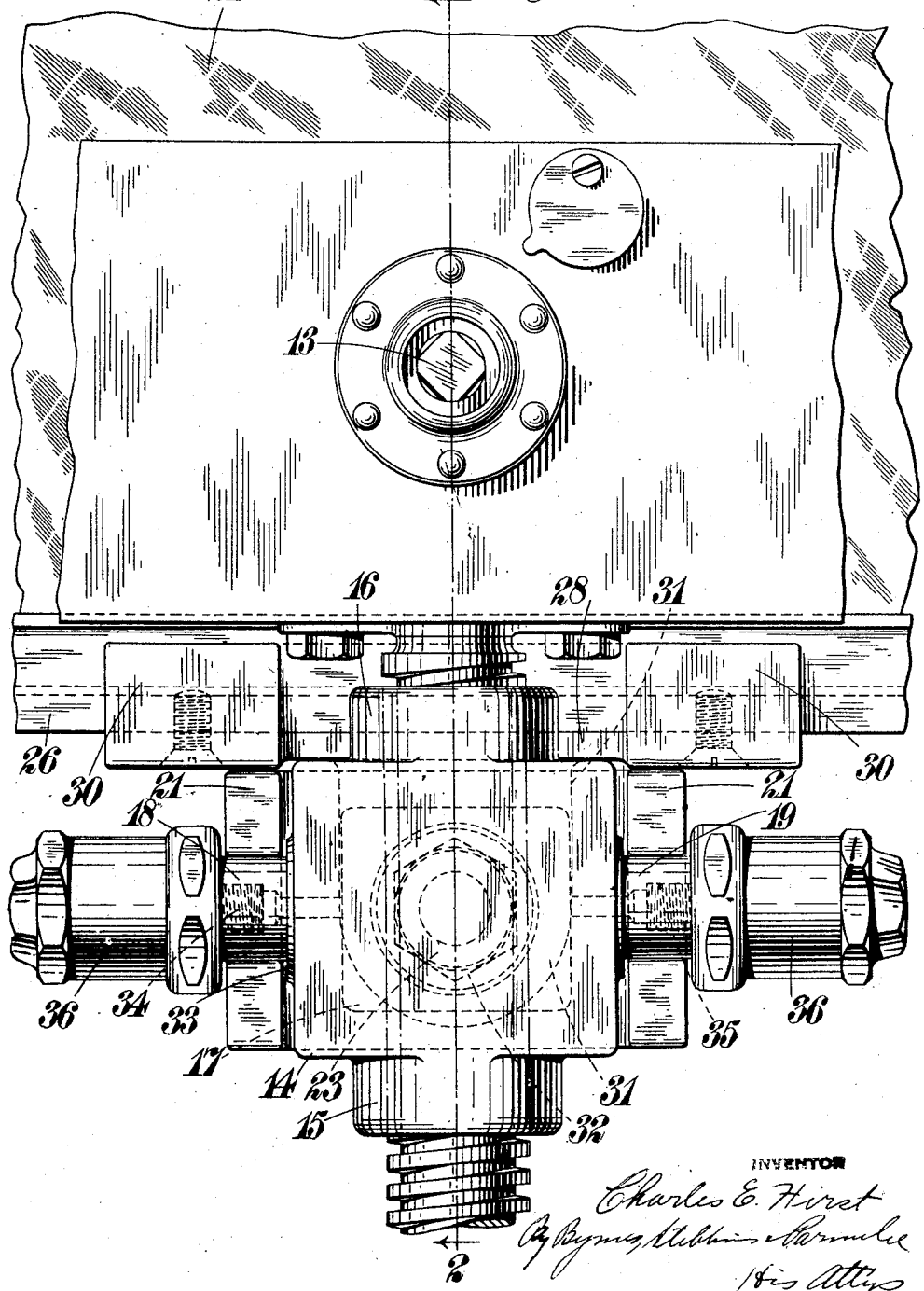
Figure 1 is an elevation looking from the lefthand side of Figure 2.

In these drawings which illustrate the actuating mechanism for a vertically-sliding window, the reference 10 indicates a screw-threaded spindle which is mounted in suitable bearings in a vertical position; it is rotated through gearing 11, 12 by a suitable handle mounted on a spindle 13. Upon this spindle 10 there is mounted a nut 14 which is in the form of a substantially rectangular box having two cylindrical extensions 15, 16, at its ends, bored and screw-threaded to engage with the spindle 10. The cavity 17 in the interior of the box constitutes the cavity aforesaid which receives the lubricant. It will be seen that this cavity extends completely around the spindle 10 so that the lubricant is in contact with the spindle on all sides.

The box 14 is provided with horizontally-disposed trunnions 18, 19 at its sides, and these trunnions each engage a slot 20 formed in the arms 21 of a yoke-member 22. This yoke-member is formed with a horizontally-projecting spigot 23.

The window, which is indicated at 24, is mounted in suitable vertical guides, and its lower edge is gripped in a two-part channel-member 25, 26 with suitable packing 27. This channel-member is in turn secured in a channel-sectioned member 28 whereof the two sides are shown at 29, 30 respectively. A part of the side 30 is cut away as shown in Figure 1 to accommodate the upper cylindrical boss 16 on the nut 14. The other side 29 of the channel-member is continuous. This channel-member is provided with a downwardly-extending boss 31 which is bored to receive the spigot 23 aforesaid, and it is retained thereon by a nut 32.

The arrangement of the trunnions 18, 19 engaging slots 20 in the arms of the yoke-member 22 is used in order to compensate for any slight lack of alignment of the vertical spindle with the window-guides when erected, and for the same reason a clearance is provided at 33 between each arm 21 and the box 14; there is thus provided a kind of universal joint between the nut 14 and the window 24.

As above stated the cavity 17 in the nut is filled with lubricant and holes are bored axially through its trunnions at 34, 35, Figure 1, for the reception of suitable grease-cups 36. Preferably these grease-cups are spring-actuated or compressed-air-actuated, so that the grease or other lubricant initially introduced into the cavity 17 through one of these holes may be maintained under a slight pressure.

It will be appreciated that owing to the comparatively large quantity of lubricant contained in the cavity 17 the lubrication of the nut and screw-threaded spindle is maintained effective for long periods without attention.

What I claim as my invention and desire to secure by Letters Patent is:—

1. The combination of a frame, a window slidable therein, a screw-threaded shaft journaled in said frame, an actuating nut displaceable on said shaft and operatively connected with said window, and means for rotating the shaft, said nut having a lubricant reservoir therein.

2. The combination of a frame, a window slidable therein, a screw-threaded shaft journaled in said frame, an actuating nut displaceable on said shaft and operatively connected with said window, means for rotating the shaft, said nut having a lubricant reservoir therein, and means for supplying lubricant to the reservoir.

In testimony whereof I affix my signature.

CHARLES EDWARD HIRST.